Dec. 2, 1969  WOLF-DIETER BENSINGER ET AL  3,481,312
ROTARY PISTON INTERNAL COMBUSTION ENGINE
Filed Nov. 9, 1967
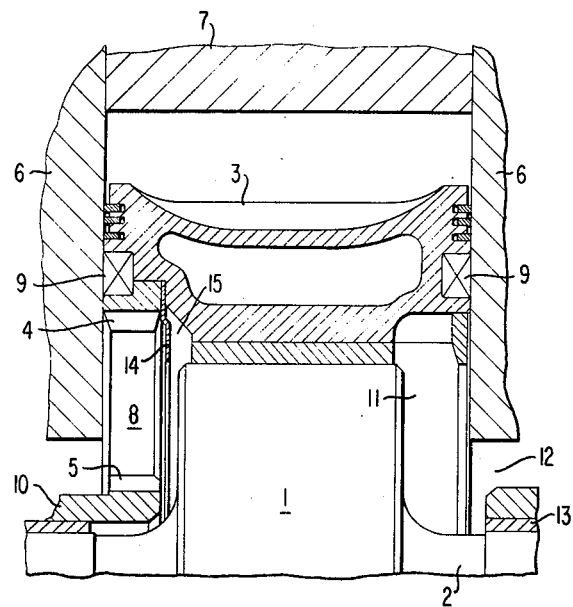
INVENTORS
WOLF-DIETER BENSINGER
HANS-OTTO DERNDINGER
KARL ZEILINGER
HANS BADER
KARL KEMPIN
BY Craig & Antonelli
ATTORNEYS

United States Patent Office 3,481,312
Patented Dec. 2, 1969

3,481,312
ROTARY PISTON INTERNAL COMBUSTION ENGINE
Wolf-Dieter Bensinger, Stuttgart-Riedenberg, Hans-Otto Derndinger, Stuttgart-Wagen, Karl Zeilinger, Stuttgart-Hedelfinger, Hans Bader, Stuttgart-Weilimdorf, and Karl Kempin, Fellbach, Wurttemberg, Germany, assignors to Daimler-Benz Aktiengesellschaft, Stuttgart-Unterturkheim, Germany
Filed Nov. 9, 1967, Ser. No. 681,620
Claims priority, application Germany, Nov. 11, 1966, D 51,519
Int. Cl. F01c *19/00*
U.S. Cl. 123—8     5 Claims

ABSTRACT OF THE DISCLOSURE

A rotary piston internal combustion engine, especially of trochoidal construction, in which a piston rotates on the eccentric of an eccentric shaft relative to the latter and to the engine housing, and which includes one engine space within the area of the piston hub on each side thereof whereby these spaces are sealed by oil seals in the radially outward direction, and in which oil is conducted away from the engine space containing the gearing for controlling the piston rotation, through the piston into the opposite engine space and from there in the direction of the housing lateral part, whereby an annularly shaped shield is arranged between the hollow gear of the gearing and its abutment surface at the piston, which projects into the engine space containing the gearing.

Background of the invention

The present invention relates to a rotary piston internal combustion engine, especially to an internal combustion engine of trochoidal construction, with a piston which is arranged on the eccentric of an eccentric shaft to rotate relative to the same and to the housing, with transmission or engine spaces provided within the area of the piston hub on both sides which are sealed radially outwardly by means of oil seals, and further with means which are operable to conduct oil out of that engine space, in which is arranged a transmission for the control of the piston rotation and having a hollow gear rigidly secured at the piston, through the piston into the opposite engine space and from there in the direction of the housing lateral part.

With rotary piston internal combustion engines of trochoidal conrtsuction, the oil seals are loaded by large oil quantities which build up in front of the oil seals. Whereas various means proposed heretofore made it possible to conduct the oil out of that engine space, in which the transmission for the control of the piston rotation is not arranged because sufficient space is present thereat, no universally satisfactory means for the discharge of the oil have been found heretofore for the engine or transmission space, in which the gearing is arranged, which can be accommodated within the given space.

Summary of the invention

The present invention aims at eliminating the aforementioned shortcomings. This is achieved according to the present invention in that an annularly shaped sheet metal shielding plate or member, which projects into the engine space, is arranged between the hollow gear and the abutment surface thereof at the piston.

The sheet metal shielding plate or member catches the largest part of the oil leaving the conventional bearing (not shown) for the piston on the eccentric of the eccentric shaft and of the oil leaving the bearing of the eccentric shaft in the housing and prevents that such oil reaches the oil seals. By the use of such an arrangement, the oil seals, which may be of any conventional construction, are considerably relieved. The oil discharged from or leaving the bearing of the piston on the eccentric shaft has a movement component axial out of the bearing, a further component tangential to the bearing and corresponding to the direction of rotation and a third component which is caused by the centrifugal force. The resultant of these three components is directed into the engine space toward the hollow gear so that the oil is caught with certainty by the shielding plate or member.

By reason of the described direction of the oil, it is not necessary to make the free inner diameter of the shielding member particularly small. It is completely sufficient if the inner diameter of the shielding member is larger, according to a further feature of the present invention, by a slight amount than the diameter of the eccentric on the eccentric shaft so that the assembly of the internal combustion engine is not impaired in any manner.

The shielding member may be slightly offset in the axial direction at the height of the teeth of the hollow gear in order not to influence, on the one hand, the engagement of the pinion in the hollow gear and in order to achieve, on the other, a reinforcement of the shielding member.

Accordingly, it is an object of the present invention to provide a rotary piston internal combustion engine of the type described above which eliminates the aforementioned shortcomings and drawbacks encountered with the prior art constructions.

Another object of the present invention resides in a rotary piston internal combustion engine in which means are provided to effectively and reliably conduct the oil out of the engine space containing the gearing which controls the rotation of the piston.

A further object of the present invention resides in a rotary piston internal combustion engine of the type described above which is provided with a completely satisfactory means assuring the oil removal out of the space containing the gearing for the piston and which is capable of being readily accommodated within the existing, available space.

Another object of the present invention resides in a rotary piston internal combustion engine in which the circulation of the oil leaving the bearings of the piston on the eccentric and of the eccentric shaft in the housing is reliably assured by extremely simple means involving no substantial expenditures and permitting ready installation without impairment to the proper operation of the engine.

These and further objects, features, and advantages of the present invention will become more obvious from the following description when taken in connection with the accompanying drawing which shows, for purposes of illustration only, one embodiment in accordance with the present invention, and wherein:

The single figure is a partial axial longitudinal cross-sectional view through a rotary piston internal combustion engine of trochoidal construction and provided with an oil conduction system in accordance with the present invention.

Referring now to the single figure of the drawing, the piston 3 which is supported on the eccentric 1 of the eccentric shaft 2, rotates relative to the eccentric shaft 2 and to the housing consisting of the lateral parts 6 and the casing 7 controlled by means of the transmission consisting of the hollow gear 4 and the pinion 5.

The hollow gear 4 is secured laterally at the piston 3 and is arranged in the engine or transmission space 8 which is sealed by means of the oil seal 9 in the radially outward direction. The pinion 5 is made in one piece with the bearing housing 10.

The piston 3 is so constructed in any known, conventional manner that oil, which stems from the bearing (not shown) of the piston 3 on the eccentric 1 and from the bearing of the eccentric shaft 2 in the lateral housing part 6, is able to reach from the engine space 8 by way of conventional bores (not shown) through the piston 3 into the oppoositely disposed engine space 11 from where it is conducted away by conventional means (not illustrated) through the aperture 12 within the area of the bearing 13 for the eccentric shaft 2.

In order that the oil accumulating in the transmission or engine space 8 does not excessively load the oil seals 9 and can be conducted off rapidly through the piston 3, the sheet metal shielding member 14 is provided in the transmission or engine space 8. This sheet metal shielding member 14 is constructed or annular shape and is arranged between the hollow gear 4 and the axial abutment surface thereof at the piston 3. The free inner diameter of the shielding member 14 is larger by a slight amount than the diameter of the eccentric 1. Within the area of the teeth of the hollow gear 4, the sheet metal shielding member 14 is slightly offset in the direction toward the piston 3. The shielding member 14 catches the oil coming from the bearing of the piston 3 on the eccentric 1 and also the largest part of the oil which stems from the bearing of the eccentric shaft 2 in the lateral part 6, and collects the same in the annular space 14 formed by the shielding plate 14 and the piston hub from where it is thereupon conducting through the piston 3 in to the opposite engine space 11 and is discharging from there in any known conventional manner.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:
1. A rotary piston internal combustion engine, especially of trochoidal construction, including a piston rotatably arranged on the eccentric of an eccentric shaft to rotate relative thereto and to the engine housing, and provided with engine spaces within the area of the piston hub on both sides thereof which are sealed in the radially outward direction by oil seals, and further having means for conducting the oil from the engine space, in which is arranged the transmission for controlling the piston rotation and having a hollow gear secured at the piston, through the piston into the oppositely disposed, second engine space and from there in the direction of the housing lateral part, wherein the improvement comprises annularly shaped shielding means arranged between the hollow gear and the abutment surface thereof at the piston, said shielding means projecting into said first-mentioned engine space in which is arranged the transmission.

2. An internal combustion engine according to claim 1, wherein the free inner diameter of the shielding means is larger by a slight amount than the diameter of the eccentric on the eccentric shaft.

3. An internal combustion engine according to claim 2, wherein the shielding means is slightly offset at the height of the teeth of the hollow gear in the axial direction.

4. An internal combustion engine according to claim 1, wherein the shielding means is slightly offset at the height of the teeth of the hollow gear in the axial direction.

5. An internal combustion engine according to claim 1, wherein said shielding means is in the shape of an annular plate with reinforcing means.

References Cited

UNITED STATES PATENTS

| | | | |
|---|---|---|---|
| 3,102,682 | 9/1963 | Paschke | 230—145 |
| 3,165,259 | 1/1965 | Muller et al. | 128—8 XR |
| 3,396,708 | 8/1968 | Tado | 230—145 |

FOREIGN PATENTS 939,704  10/1963  Great Britain

C. J. HUSAR, Primary Examiner